Dec. 24, 1957  S. JENCICK  2,817,246
POWER-STEERING MECHANISM
Filed July 8, 1953
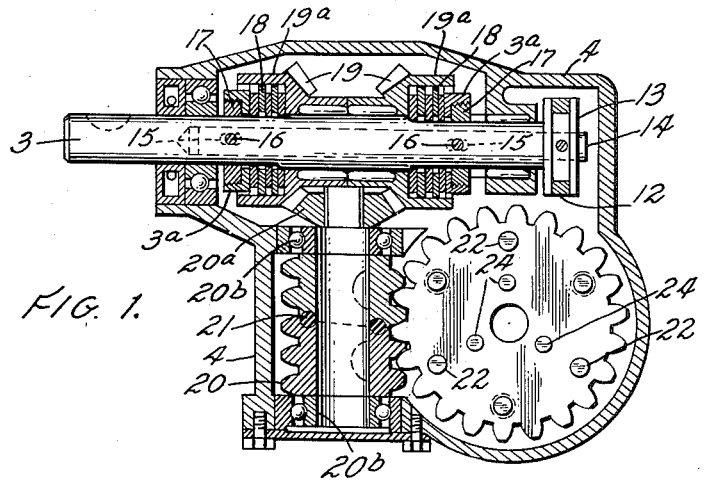
FIG. 1.
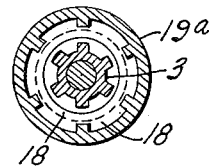
FIG. 3.
FIG. 4.
FIG. 5.
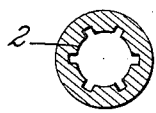
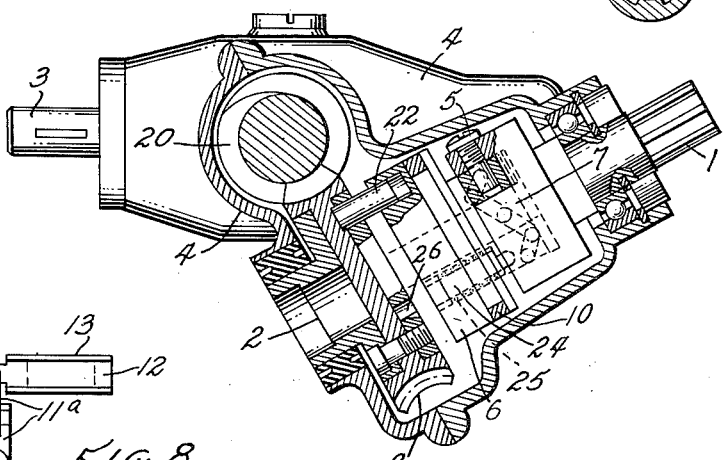
FIG. 2.
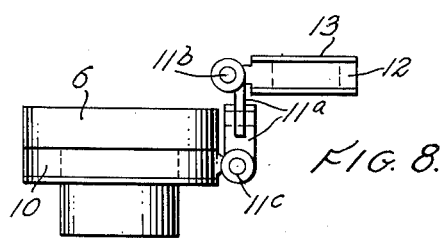
FIG. 8.
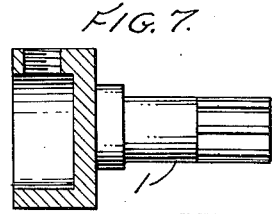
FIG. 7.
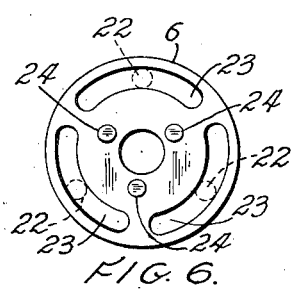
FIG. 6.
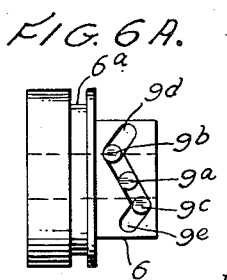
FIG. 6A.
INVENTOR.
STEPHEN JENCICK
BY Milburn & Milburn
ATTORNEYS United States Patent Office 2,817,246
Patented Dec. 24, 1957

2,817,246
POWER-STEERING MECHANISM
Stephen Jencick, Chagrin Falls, Ohio
Application July 8, 1953, Serial No. 366,723
7 Claims. (Cl. 74—388)

This invention relates to the art of power-steering mechanism for automotive devices, as for instance automobiles.

I am aware that there have been prior power-steering mechanisms of hydraulic and mechanical construction but, according to my information, at least some of them have proved to be quite unsatisfactory because of their complicated nature and high cost of manufacture and also because of noise in operation, lack of dependability and inefficiency in other respects.

Therefore, it is the object of my present invention to devise such a mechanism that is of a mechanical nature throughout and is capable of dependable operation in a quiet and efficient manner and may be manufactured at a reasonable cost.

Other objects will appear from the following description and claims when considered together with the accompanying drawing.

Fig. 1 is a view, mostly in section through a transverse plane, illustrating my present improved device;

Fig. 2 is a view, partly in section and partly in elevation, through a vertical plane;

Fig. 3 is a sectional view through one of the clutch means;

Fig. 4 is an end view of the manipulating shaft;

Fig. 5 is an end view of the power output shaft connection;

Fig. 6 is a view in end elevation of the member for converting rotary movement of the steering column into straight-line movement;

Fig. 6A is a side elevation of the member shown in Fig. 6;

Fig. 7 is a separate view of the rotary shaft member for connection to the steering column; and Fig. 8 illustrates the universal connection for transmitting the straight-line movement to the clutch means.

It is to be understood that the present form of disclosure is merely for the purpose of illustration and that there might be devised various modifications thereof without departing from the spirit of my invention as herein set forth and claimed.

Referring now to the accompanying drawing in detail, the present mechanism may be recognized as a unitary assembly that is capable of being installed upon the conventional automobile for instance. With this in mind, there is provided the male spline upon the rotary manipulating shaft 1 that is adapted for connection to the steering shaft or column having the conventional steering wheel; and there is provided also the female spline shaft connection 2 for the power out-put to the automobile front wheels for steering the same in the usual manner except that the present device is power-operated. The present unit has also keyed shaft end 3 for power in-put drive connection from the regular automobile fan shaft by means of a belt, for instance, or from any other operating shaft of the automobile engine so as to be driven thereby.

My present mechanism may be enclosed within a casing or housing 4 that may be mounted upon one side of the engine block; and, by virtue of my present compact form of mechanical unit, it will not be so close to the spark plugs as to cause any short circuit or sparking, as might result from undue proximity, and will not otherwise interfere with the arrangement or operation of any part of the regular internal combustion engine of the familiar automobile. As may be fully realized by those who are familiar with the V-type of automobile engine, which is very much in vogue at the present time, there is only a very limited space for mounting such a device as the present one, and hence the compactness of the present unit is a very important consideration.

The manipulating shaft 1, which is mounting with suitable bearings in the housing 4, has radially inwardly extending pins 5 with their inner ends in operative engagement in inclined slots in the annular reciprocatable member 6 which is adapted for straight-line movement along the hub 7 of the gear 8 upon which is provided the female spline connection 2 for rotation thereof in a manner to be hereinafter explained.

The inclined slots, just referred to, each have the middle netural point 9a and the portions 9b and 9c immediately adjacent thereto for effecting forward and rearward movement, respectively, corresponding to steering in the left and right directions, respectively, as will be understood from the following.

The annular member 6 has an annular groove 6a within which freely engages a ring 10. This ring 10 has universal connection (consisting of link members 11a with pivotal connections 11b and 11c at their ends at right angles to each other), to the companion ring 12 which engages freely within the annular grooved member 13 fixed on one end of the smaller shaft 14. The shaft 14 extends co-axially within the hollowed-out outer shaft 3 to which power is adapted to be applied, as above noted. The shaft 14 has the longitudinal slots 15 through which extend the diametrically disposed pins 16 removably connected at their outer ends to the adjustable screw rings 17 for varying the tension upon the annular friction clutch disks 18 between the flanged annular member 3a on the shaft 3 and the bevel gear 19 in each instance, there being two sets of such clutch disk and bevel gear, as clearly illustrated in the drawing, so as to obtain either right-hand or left-hand rotation of the worm 20 in operative engagement with the gears 19 through the pinion 20a. The engagement of the pins 16 in their slots 15 will serve also to prevent accidental loosening of the screw rings 17.

For the sake of quietness of operation, the worm 20 is mounted in two longitudinal halves upon its hub and has provided therebetween the ring of synthetic rubber 21 so as to resiliently maintain the same axially against the bearings 20b at the ends thereof and also in effective engagement with its gear 8 and thereby prevent any shatter between these parts, as might otherwise result from loose fit or wear.

The clutch connection 18 may be effected between the shaft 3 and the bevel gears 19 by mounting the friction clutch disks alternately at their inner and outer marginal edges upon the shaft 3 and the co-axially extending annular flange 19a of the gear 19 in each instance so that their inner portions will overlap each other for frictional engagement.

With the mechanism as just described, rotary manipulation of the conventional steering wheel and likewise the steering shaft 1, will cause the pins 5 and their companion cam slots to produce a straight-line movement of the member 6 in either the right-hand or left-hand direction according to whether the steering manipulation is to the right or to the left. Such movement of member 6 will cause a corresponding straight-line movement of the shaft 14 through the universal link connections between the rings 10 and 12; and, as a result, there will be effected clutch connection between the rotating shaft 3 and one of the gears 19. The operation of one of the gears 19 will cause rotation of the worm 20 in either the right or left direction and like rotation of the shaft 2 and thereby the desired manipulation of the front wheels for steering the same in the desired direction. It is understood, of course, that after having effected clutch connection between the shaft 3 and one of the gears 19, the slotted shaft 14 may be returned whenever desired to the neutral position indicated in Fig. 1 of the present drawing. This pin and slot engagement serves also to determine the extent of relative movement between the clutch elements.

The worm gear 8 has affixed thereto a plurality of co-axially rearwardly extending limit pins 22, three being here shown, the free ends of which engage within annular recesses 23 in the adjacent or forward face of the member 6 so as to serve as a guide means for the movement of the member 6 and also for another purpose to be now explained. Here it might be noted that the recesses 23 will be of such length and the rest of my mechanism will be so designed as to permit and to effect the necessary turning of the gear 8 for any and all degree of steering in the usual operation of the automobile and without interfering with the member 6 and its intended manipulation as herein set forth.

I will now refer to an emergency provision for strictly manual steering in the event of any failure of the power means or in the event that the operator desires quicker action than is possible with the power mechanism. With this in mind, the cam groove in the member 6 has an angular extension from each of the points 9b and 9c in such direction as to bring the ends 9d and 9e thereof in circumferential register with the neutral point 9a corresponding to the withdrawn position of the member 6, as indicated in Fig. 2 of the present drawing. Thus when it is either necessary or desirable to effect a steering action in a strictly manual manner, the steering wheel and the shaft 1 may be turned in the desired direction to such extent as to bring the pin 5 to either the end 9d or 9e of the slot in the member 6, in each instance, at which point the inner ends of the three pins 5 will engage the inner ends of the co-axially extending pins 24 in the member 6 so as to force the same against their individual coil springs 25 and into the corresponding recesses 26 in the adjacent or rear face of the gear 8 and thereby establish rotary turning connection between the shaft 1 and the gear 8 for strictly manual steering operation, by the continued turning of the shaft 1 by means of the steering wheel thereon. The pins 24 are equispaced about the axis of the member 6. Such rotatable movement of the member 6 is permitted by the slots 23, insofar as the pins 22 are concerned; and the engagement of the extreme ends of the recesses 23 with the pins 22 corresponds with the registry of the pins 24 with the recesses 26 so that the turning of pins 5 and member 6 to such extent will ensure engagement of pins 24 in the recesses 26. Upon return of the steering wheel and shaft 1 to neutral position, that is upon disengagement of the pins 5 from the pins 24, the springs 25 will force the pins 24 rearwardly out of engagement with the recesses 26; and the device will then be again ready for steering in the direction and in the manner desired. It is to be observed that, during the strictly manual steering, the clutches 18 are out of engagement and consequently there is no resistance to such manual operation.

As may be observed, the gears 19 are connected to shaft 3 only upon actuation of the steering mechanism by the power means; and this means that the gears 19 are idle while there is no power-steering, which of course means greater quietness of operation than would otherwise be possible. This arrangement also entails less wear upon the parts, as for instance the gear elements, and a saving of power.

Among other advantages of my present device may be mentioned the comparatively few parts with correspondingly less cost and greater simplicity of construction and operation, increased efficiency, dependability and safety in the performance of the device, including the provision of the emergency exclusively manual means of operation.

What I claim is:

1. A power-steering mechanism comprising a power input shaft adapted to be connected to a source of power for rotating the same, a rotatable manipulating shaft adapted to have connected thereto a rotatable hand-operated steering wheel, a power output shaft adapted for steering connection with the wheels to be steered, right-hand and left-hand gears mounted upon said input shaft and having individual clutch means operatable axially of said input shaft for connecting either of said gears with said input shaft for either right or left steering, a worm operatively connected to said gears for operation by either of them, a worm gear mounted upon said power output shaft and having operative engagement with said worm, and means of operative connection between said manipulating shaft and said clutch means for converting the rotary movement of said manipulating shaft into a straight-line actuation of said clutch means for either right or left steering.

2. A power-steering mechanism comprising a power input shaft adapted to be connected to a source of power for rotating the same, a manipulating shaft adapted to have connected thereto a rotatable hand-operated steering wheel, a power output connecting means adapted for steering connection with the wheels to be steered, said output connecting means having operatively connected thereto normally idle gear means for right and left steering, clutch means between said input shaft and said gear means for operative connection therebetween, and means controlled by said manipulating shaft for effecting axial movement of said clutch means for establishing said operative connection to said input shaft for either right or left steering, and in which said last-named means includes pin and inclined slot mechanism for converting the rotary movement of said manipulating shaft into straight-line movement for actuation of said clutch means.

3. A power-steering mechanism comprising a power input shaft adapted to be connected to a source of power for rotating the same, a manipulating shaft adapted to have connected thereto a rotatable hand-operated steering wheel, a power output connecting means adapted for steering connection with the wheels to be steered, said output connecting means having operatively connected thereto normally idle gear means for right and left steering, clutch means between said input shaft and said gear means for operative connection therebetween, and means controlled by said manipulating shaft for effecting axial movement of said clutch means for establishing said operative connection to said input shaft for either right or left steering, and in which said last-named means includes a pin and slot means for each of said clutch means axially arranged with respect to the direction of adjustment of said clutch means, the length of said slot in each instance corresponding to right-hand and left-hand steering and having a neutral position therebetween.

4. A power-steering mechanism comprising a power input shaft adapted to be connected to a source of power for rotating the same, a manipulating shaft adapted to have connected thereto a rotatable hand-operated steering wheel, a power input connecting means adapted for steering connection with the wheels to be steered, said output connecting means having operatively connected thereto normally idle gear means for right and left steering, clutch means between said input shaft and said gear means for operative connection therebetween, and means controlled by said manipulating shaft for effecting axial movement of said clutch means for establishing said operative connection to said input shaft for either right or left steering, and in which said last-named means includes pin and inclined slot mechanism for converting the rotary movement of said manipulating shaft into straight-line movement for actuation of said clutch means and includes also a pin and straight slot mechanism associated with said input shaft for manipulation of each of said clutch means and axially arranged with respect to the direction of adjustment of said clutch means, the length of said slot in each instance corresponding to right-hand and left-hand steering and having a neutral position therebetween.

5. A power-steering mechanism comprising a power input shaft adapted to be connected to a source of power for rotating the same, a rotatable manipulating shaft adapted to have connected thereto a hand-operated steering wheel, a power output shaft adapted for steering connection with the wheels to be steered, right-hand and left-hand gears mounted upon said input shaft and having individual clutch means operatable axially of said input shaft for connecting either of said gears with said input shaft for either right or left steering, a worm operatively connected to said gears for operation by either of them, a worm gear mounted upon said power output shaft and having operative engagement with said worm, a member arranged co-axially with respect to said output shaft and having inclined slot and pin engagement with said manipulating shaft so as to produce straight-line movement of said member, said inclined slot having angular end extensions terminating in the circumference which includes the neutral middle point of said inclined slot, co-axially arranged means provided within said member and in the path of said pin for effecting rotatable engagement thereof with said gear, whereby said steering wheel may be manipulated for steering operation either with or without connection to said power input shaft.

6. A power steering mechanism comprising a power input shaft adapted to be connected to a source of power for rotating the same, a rotatable manipulating shaft adapted to have connected thereto a hand-operated steering wheel, a power output shaft adapted for steering connection with the wheels to be steered, right-hand and left-hand gears mounted upon said input shaft and having individual clutch means operatable axially of said input shaft for connecting either of said gears with said input shaft for either right or left steering, a worm operatively connected to said gears for operation by either of them, a worm gear mounted upon said power output shaft and having operative engagement with said worm, a co-axially arranged auxiliary shaft with longitudinal movement within said input shaft and having pin and slot connection with said clutch means for operation of the same, and means of operative connection between said manipulating shaft and said auxiliary shaft for converting the rotary movement of said manipulating shaft into a straight-line actuation of said auxiliary shaft and said clutch means.

7. The same structure as recited in claim 1 hereof and in which said worm has end bearings and comprises longitudinally arranged parts with a resilient means therebetween for maintaining the same in effective engagement with its end bearings and also with the said worm gear.

References Cited in the file of this patent
UNITED STATES PATENTS

| | | |
|---|---|---|
| 1,476,886 | Haubert | Dec. 11, 1923 |
| 1,699,256 | Main | May 8, 1928 |
| 1,787,319 | McDonald | Dec. 30, 1930 |
| 2,150,019 | Baule | Mar. 7, 1939 |
| 2,553,795 | Staude | May 22, 1951 |